(12) United States Patent
Janik et al.

(10) Patent No.: US 6,411,463 B1
(45) Date of Patent: Jun. 25, 2002

(54) INSERT FOR DAMPENING ACOUSTIC VIBRATION AND SHIELDING MAGNETIC FLUX FOR USE IN A DISC DRIVE

(75) Inventors: Peter R. Janik, Shakopee; Robert A. Hanson, Bloomington, both of MN (US)

(73) Assignee: Seagate Technology LLC, Scotts Valley, CA (US)

( * ) Notice: Subject to any disclaimer, the term of this patent is extended or adjusted under 35 U.S.C. 154(b) by 68 days.

(21) Appl. No.: 09/621,295

(22) Filed: Jul. 20, 2000

Related U.S. Application Data

(60) Provisional application No. 60/145,509, filed on Jul. 23, 1999.

(51) Int. Cl.[7] ............................................... G11B 17/02
(52) U.S. Cl. ................................................... 360/97.01
(58) Field of Search ........................... 360/97.01–99.12

(56) References Cited

U.S. PATENT DOCUMENTS

| | | | |
|---|---|---|---|
| 4,034,411 A | 7/1977 | Kraemer et al. ............... 360/98 |
| 4,519,010 A | 5/1985 | Elsaesser et al. ............. 360/97 |
| 4,604,665 A | 8/1986 | Müller et al. ................. 360/97 |
| 5,214,549 A | 5/1993 | Baker et al. ............. 360/97.02 |
| 5,233,493 A | 8/1993 | Eliason ....................... 360/106 |
| 5,357,160 A | 10/1994 | Kameda et al. ........... 310/67 R |
| 5,430,589 A | 7/1995 | Moir et al. ............... 360/97.02 |
| RE35,019 E | 8/1995 | Ueki et al. ................ 360/97.02 |
| 5,446,610 A | 8/1995 | Elsaesser et al. ......... 360/99.08 |
| 5,477,401 A | 12/1995 | Squires et al. ................. 360/75 |
| 5,557,487 A | 9/1996 | Elsaesser et al. ......... 360/99.08 |
| 5,619,389 A | 4/1997 | Dunfield et al. .......... 360/98.07 |
| 5,694,268 A | 12/1997 | Dunfield et al. .......... 360/98.07 |
| 5,757,580 A * | 5/1998 | Andress et al. ........... 360/97.02 |
| 5,774,302 A | 6/1998 | Elsaesser et al. ......... 360/98.07 |
| 5,777,821 A | 7/1998 | Pottebaum ................ 360/97.02 |
| 5,844,754 A | 12/1998 | Stefansky et al. ............ 360/106 |
| 5,864,443 A | 1/1999 | Elsaesser et al. ......... 360/99.08 |
| 5,875,067 A | 2/1999 | Morris et al. ............. 360/97.01 |
| 5,877,916 A | 3/1999 | Papst ....................... 360/98.07 |
| 5,997,267 A | 12/1999 | Lee ........................... 417/423.7 |
| 6,288,866 B1 * | 9/2001 | Butler et al. ............. 360/97.01 |

* cited by examiner

Primary Examiner—Robert S. Tupper
(74) Attorney, Agent, or Firm—Brian D. Kaul; Westman, Champlin & Kelly

(57) ABSTRACT

The present invention is directed to an insert for use in a disc drive to dampen acoustic vibration and shield electronic elements from stray magnetic flux generated by a magnet assembly of a voice coil motor. The insert includes an acoustic insulator portion and a magnetic shield. The acoustic insulator portion is compressed between a base and a circuit board of the disc drive to suppress vibration of the circuit board. The magnetic shield is attached to the acoustic insulator portion below the magnet assembly and is shaped to shield a portion of the circuit board from stray magnetic flux generated by the magnet assembly.

14 Claims, 3 Drawing Sheets

FIG._1

INSERT FOR DAMPENING ACOUSTIC VIBRATION AND SHIELDING MAGNETIC FLUX FOR USE IN A DISC DRIVE

CROSS-REFERENCE TO RELATED APPLICATION

This application claims the benefit of U.S. Provisional Patent Application No. 60/145,509, entitled "HARD DISC DRIVE STRAY MAGNETIC FLUX SHIELD," filed on Jul. 23, 1999.

FIELD OF THE INVENTION

The present invention relates to a method and apparatus for damping acoustic vibration and shielding electronic components of a disc drive from stray magnetic flux.

BACKGROUND OF THE INVENTION

Disc drives of the "Winchester" type are well known in the industry. Such drives use rigid discs coated with a magnetizable medium for storage of digital information in a plurality of circular, concentric data tracks. The discs are rotatably mounted to a base of the disc drive and are rotated via a spindle motor, which causes the discs to spin and the surfaces of the discs to pass under a respective head. Each head includes a hydrodynamic (e.g. air) bearing slider in a transducer for writing information to and reading information from the disc surface. An actuator mechanism moves the heads from track to track across the surfaces of the discs under control of electronic circuitry. The actuator mechanism includes a track accessing arm and a head suspension assembly for each head. Movement of the actuator mechanism is controlled by a voice coil motor (VCM). A printed circuit board (PCB) is mounted to the bottom of the base and contains electronic elements, which control the operation of the spindle motor, the operation of the actuator mechanism and the transfer of data to and from the discs.

In the actuator mechanism, the heads are cantilevered outward over the disc surfaces from a common pivot structure, while the coil of the VCM extends horizontally outward from the other side of the pivot structure. A magnet assembly and a pole piece structure is fixedly mounted to the base of the disc drive above the PCB in such an arrangement that the flat coil is supported in the middle of the magnetic field formed by the magnet assembly. Sophisticated control logic applies a carefully calculated amount and polarity of DC power to the ends of the coil to controllably move the coil within the magnetic field, thus moving the heads, which are fixed in relationship to the coil, across the disc surfaces.

Due to a high demand for disc drives having fast data access rates, increasingly stronger magnet assemblies have been used so that the head can be actuated faster. One problem with these magnet assemblies is that the magnetic flux that is produced cannot be completely contained within the region of the coil. As a result, stray magnetic flux impinges upon a portion of the PCB and attracts magnetic particles to the electronic elements located there. These particles can become trapped between the leads of the electrical elements resulting in electrical shorting and failure of the disc drive.

One method used to protect the electronic elements of the PCB from the effects of the stray magnetic flux is to cover or encapsulate the electronic elements that could be affected by stray magnetic flux from the magnet assembly. Here, the cover is held onto the electronic elements using a pressure sensitive adhesive. In addition to being costly to implement, one of the problems with this solution is that the operating temperature of the electronic elements increases significantly, which could lead to premature failure of the disc drive. Furthermore, reworking the electronic elements becomes more difficult. As a result, this solution is less than ideal.

Another problem found in disc drives is the generation of acoustic noise. Rapid movement of the various components of the disc drive including the rotating spindle motor, the actuator, and the discs themselves, tends to generate a wide variety of undesirable acoustic vibrations within the disc drive. These vibrations tend to be amplified by the generally highly flexible PCB of the disc drive.

It is therefore desirable to create a disc drive that reduces the effects of stray magnetic flux from the voice coil motor on electronic components on the PCB while dampening the vibration of the PCB.

SUMMARY OF THE INVENTION

The apparatus of the present invention is directed to an insert for use in a disc drive that dampens acoustic vibration and shields electronic elements from stray magnetic flux generated by a magnet assembly of a voice coil motor. The insert includes an acoustic insulator portion and a magnetic shield. The acoustic insulator portion is compressed between a base and a circuit board of the disc drive to suppress vibration of the circuit board. The magnetic shield is attached to the acoustic insulator portion below the magnet assembly and is shaped to shield a portion of the circuit board from stray magnetic flux generated by the magnet assembly.

These and various other features as well as advantages, which characterize the present invention, will be apparent upon reading of the following detailed description and review of the associated drawings.

DETAILED DESCRIPTION OF ILLUSTRATIVE EMBODIMENTS

Figure 1:
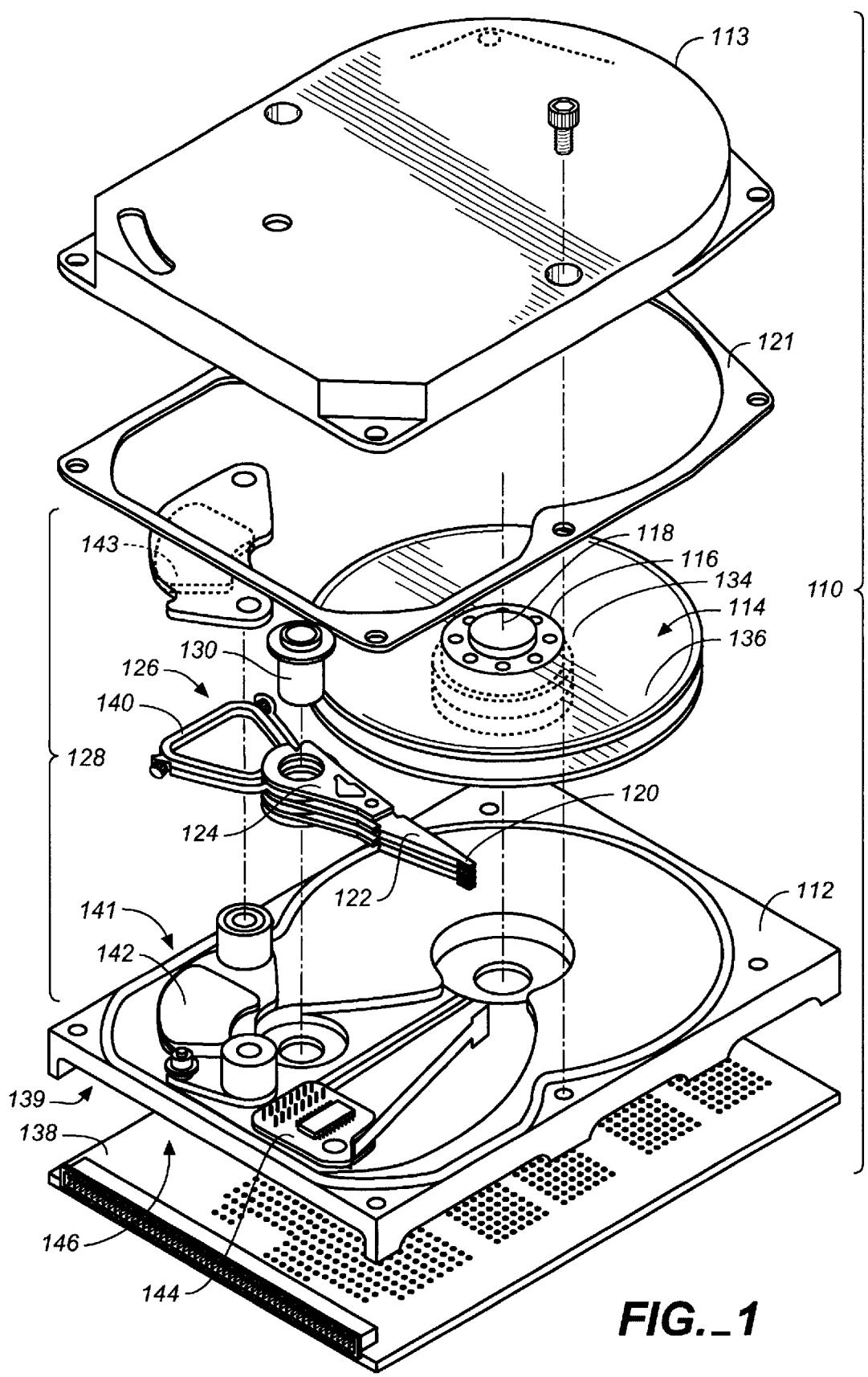
FIG. 1 shows an exploded perspective view of an example of a disc drive to which the present invention can be applied.

FIG. 1 shows an exploded perspective view of a disc drive 110, which can benefit from the present invention. Disc drive 110 includes a housing with base 112 and top cover 113. Disc drive 110 further includes disc pack 114, which is mounted on a spindle motor (not shown) by disc clamp 116. A gasket 121 can be used to form a seal between base 112 and cover 113 to protect disc pack 114. Disc pack 114 includes a plurality of individual discs, which are mounted for co-rotation about central axis 118. Each disc surface has an associated head 120 which is positioned for communication with the disc surface. In the examples shown, transducing heads 120 are supported by head suspension assemblies 122 which are in turn attached to track accessing arms 124 of actuator mechanism 126.

Actuator mechanism 126 is of the type generally known as a "rotary moving coil actuator" and includes a voice coil motor (VCM), shown generally at 128. VCM 128 rotates actuator mechanism 126 with its attached heads 120 about pivot shaft 130 to position heads 120 over a desired tract along an arcuate path between disc inner diameter 134 and outer diameter 136. Printed circuit board (PCB) 138 mounts to bottom 139 of base 112 and contains electronic components which control the operation of the spindle motor, the operation of actuator mechanism 128, and the transfer of data to and from discs 114.

Heads 120 are cantilevered outward over the surfaces of disc 114 from shaft 130, while coil 140 of VCM 128 extends horizontally outward from the other side of shaft 130. VCM 128 includes a magnet assembly, generally depicted as 141, having two bipolar magnets 142 and 143, shown in FIG. 1. Magnets 142 and 143 can be, for example, neodymium-iron-boron bipolar magnets. Magnet assembly 141 of VCM 128 produces a stationary magnetic flux field which is oriented transversely to the plane of coil 140. Movement of actuator mechanism 126 can be controlled by control logic 144 which applies a carefully calculated amplitude and polarity of DC power to coil 140 which causes a DC current to flow through coil 140 thus producing a magnetic field around coil 140. The magnetic field around coil 140 interacts with the stationary magnetic flux field and produces a force that causes coil 140 and actuator mechanism 126 to rotate about shaft 130. The direction of the force and the rotation of actuator mechanism 126 is dependent upon the direction the current flows through coil 140 and the direction of the stationary magnetic flux field. The magnitude of the force and the speed at which actuator mechanism 126 is rotated is dependent upon the magnitude of the current flowing through coil 140 and the magnitude of the stationary magnetic flux field produced by magnet assembly 126.

Disc drive manufactures use increasingly powerful permanent magnets to form magnet assembly 141 to provide quicker movement of actuator mechanisms 126 to meet demands for fast data access rates. These powerful permanent magnets form strong stationary magnetic flux fields which cannot be completely contained within the region VCM 128. As a result, the stray magnetic flux impinges upon a portion of PCB 138, shown generally at 146, which causes magnetic particles to be attracted to portion 146 of PCB 138 and to the electronic components located there. The attracted magnetic particles can become trapped between the leads of the electronic components which can cause electrical shorting and failure of the disc drive. As will be discussed in greater detail below, one aspect of the present invention is to protect portion 146 of PCB 138 from the stray magnetic flux generated by magnet assembly 141.

During operation of disc drive 110, the rapid movement of various components such as disc pack 114 and actuator mechanism 126, causes components of disc drive 110 to vibrate. At certain frequencies, these vibrations can generate undesirable acoustic noise. One particularly problematic source of acoustic noise is PCB 138 which receives the vibrations through base 112. Due to the flexibility of PCB 138, the vibrations and the resulting acoustic noise tends to be amplified. Another aspect of the present invention is to dampen the vibration of PCB 138 to reduce acoustic noise.

Figure 2:
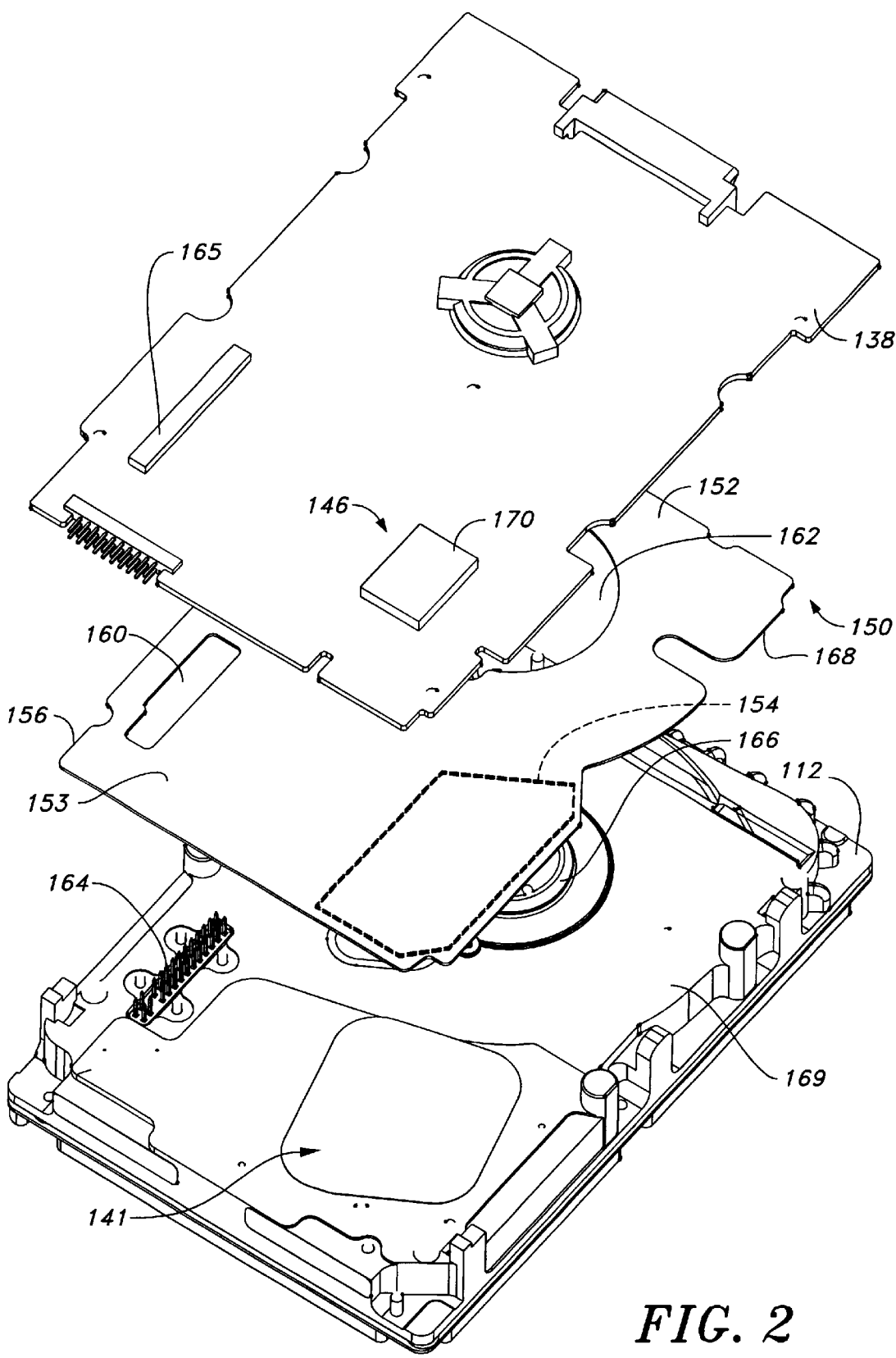
FIG. 2 is an exploded perspective view of a base and circuit board of a disc drive with an insert sandwiched therebetween, in accordance with embodiments of the present invention.

FIG. 2 shows an exploded perspective view of an insert 150, in accordance with various embodiments of the present invention, sandwiched between base 112 and PCB 138. Insert 150 generally includes acoustic insulator portion 152 to suppress the vibration of PCB 138 and magnetic shield 154 to shield portion 146 of PCB 138 from stray magnetic flux generated by magnet assembly 141.

Acoustic insulator portion 152 is a thin planer member made of a compressible material having vibration-absorbing qualities. The thickness of acoustic insulator portion 152 is sized in accordance with the space available between base 112 and PCB 138, but is generally around 25 mils thick. This material can be, for example, open celled polyester urethane foam, polypropylene foam, polyester foam and other suitable vibration absorbing materials. In a preferred embodiment, acoustic insulator portion 152 is formed of AM600 polypropylene material produced by 3M Corporation. Acoustic insulator portion 152 can also include a non-flammable thin film layer 153 on bottom side 155 of insert 150 to prevent electrostatic build up. Thin film layer 153 can be formed of a suitable thermoplastic polyurethane film, such as VC514 produced by 3M Corporation, or other suitable material. Thin film layer 153 preferably has a thickness of approximately 4 mils.

Magnetic shield 154 is a thin planer member which is shaped to shield portion 146 of PCB 138 from stray magnetic flux generated by magnet assembly 141 of VCM 128. Magnetic shield 154 is preferably fastened to top side 168 of acoustic insulator portion 152 with a suitable adhesive to face bottom side 169 of base 112. This arrangement maximizes the surface area of acoustic insulator portion 152 that contacts PCB 138. Magnetic shield 154 is made of a non-magnetic material such as iron, or stainless or carbon steels. Suitable stainless and carbon steels include 430, 1010, and 1008 steels. Magnetic shield 154 can also include a corrosion-resistant coating to prevent magnetic shield 154 from oxidizing. Experiments have indicated that magnetic shield 154 provides effective shielding of portion 146 of PCB 138 with a thickness from 2–10 mils. For example, that a magnetic shield 154 made of cold role steel having a thickness of 5 mils can reduce the magnetic flux impinging on portion 146 of PCB 138 by approximately 67%. The adhesive generally increases the thickness of insert 150 at magnetic shield 154 by approximately an additional 2 mils. The thickness of magnetic shield 154 that is chosen should not cause PCB 138 to bow significantly.

Figure 3:
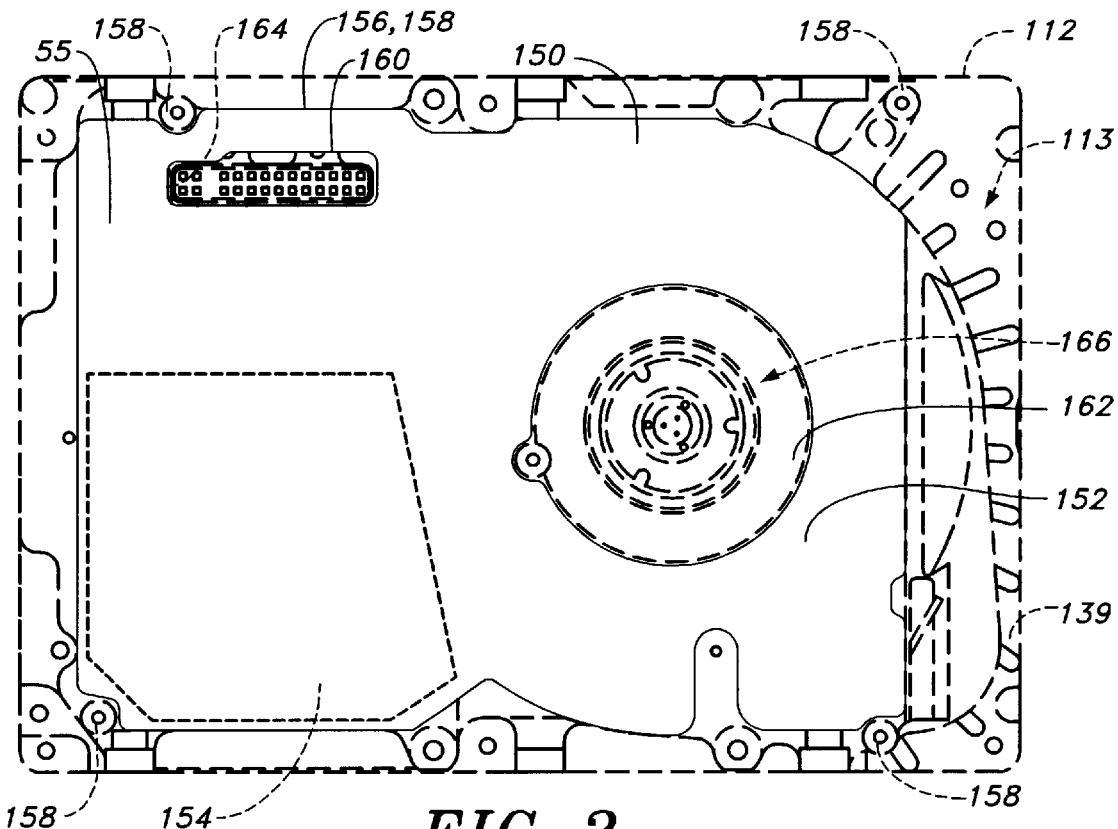
FIG. 3 is a bottom plan view of a base of a disc drive having an insert positioned thereon in accordance with embodiments of the present invention.
Figure 4:
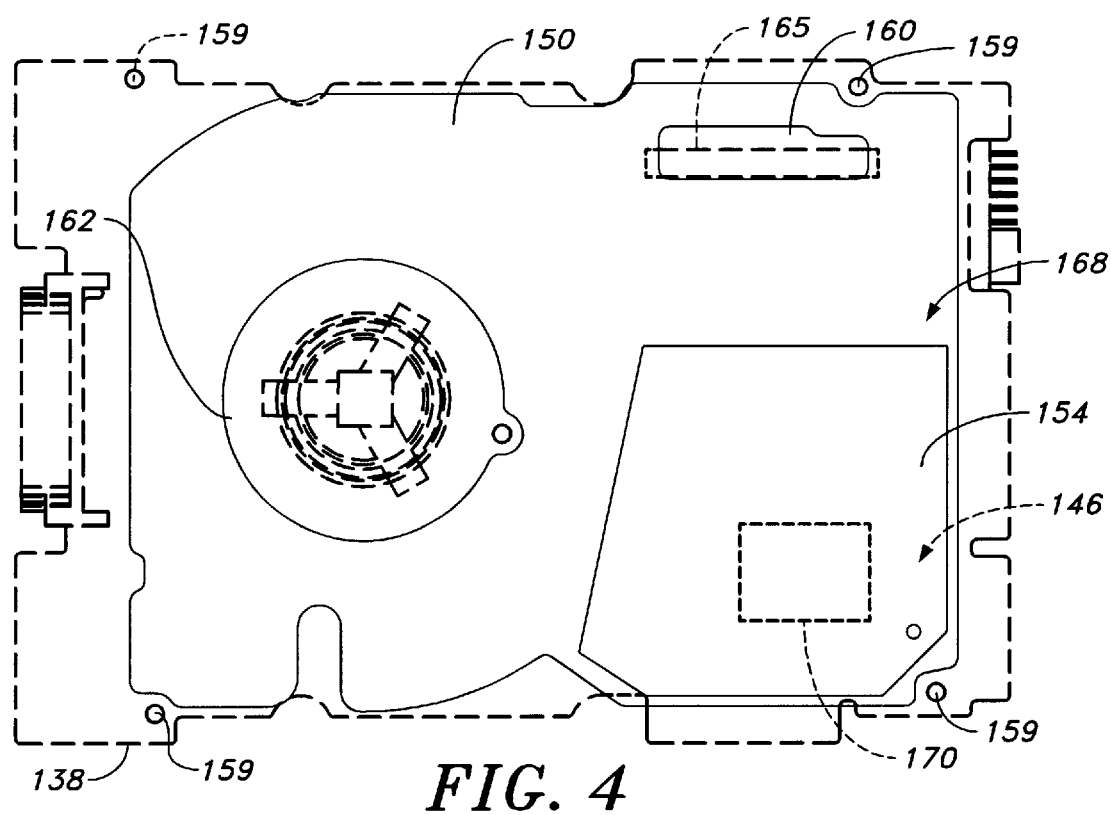
FIG. 4 is a top plan view of a circuit board having an insert positioned thereon in accordance with embodiments of the present invention.

FIGS. 3 and 4 show the position of insert 150 relative to base 112 and PCB 138, respectively, when disc drive 110 is assembled. Dashed lines are used to depict base 112 and PCB 138 to better distinguish insert 150. Perimeter 156 of acoustic insulator portion 152 is cut to conform to various features of base 112 such as screw holes 158 of base 112 and corresponding apertures 159 of PCB 138, that are used to attach PCB 138 to bottom 169 of base 112. Cut outs 160 and 162 can be made to accommodate connecting pins 164 and spindle motor 166 of base 112. Connecting pins 164 are received by socket 165 (FIGS. 2 and 4) of PCB 138 when disc drive 110 is assembled to electrically couple the electronics of PCB 138 to the various components of disc drive 110. The shape of perimeter 156 along with cut outs 160 and 162 ensure that insert 150 will be properly installed on bottom 169 of base 112.

When insert 150 is properly positioned on bottom 169 of base 112, magnetic shield 154 lies below magnet assembly 141 (FIG. 2 and FIG. 3) and above portion 146 of PCB 138 (FIG. 4). In one embodiment, magnetic shield 154 is shaped to cover the horizontal cross-sectional area or footprint of magnet assembly 141 to provide maximum protection to portion 146 of PCB 128. In another embodiment, magnetic shield 154 is shaped in accordance with the area of portion 146 of PCB 138 that is to be shielded. In particular, magnetic shield 154 is shaped to protect at least one electronic component 170 (FIGS. 2 and 4) which is to be shielded from the stray magnetic flux generated by magnet assembly 141.

As a result, magnetic shield 154 can be sized to meet the particular needs of a particular disc drive 110.

In summary, the present invention is directed to an insert for use in a disc drive storage system. The disc drive storage system generally includes a disc rotatably mounted to a base which has a bottom, an actuator mechanism mounted to the base and including a magnet assembly for positioning a transducing head over the disc, and a circuit board having electronic components mounted to the bottom of the base for controlling the operations of the disc drive. The insert generally includes an acoustic insulator portion and a magnetic shield. The insulator portion is compressible between, and adapted to suppress vibration of, the base and the circuit board. The magnetic shield is fastened to the planar portion below the magnet assembly and shaped to shield a portion of the circuit board from stray magnetic flux generated by the magnet assembly.

It is to be understood that even though numerous characteristics and advantages of various embodiments of the present invention have been set forth in the foregoing description, together with details of the structure and function of various embodiments of the invention, this disclosure is illustrative only, and changes may be made in details, especially in matters of structure and arrangement of parts within the principles of the present invention to the full extent indicated by the broad general meaning of the terms in which the appended claims are expressed. For example, magnetic shield 154 could be placed on bottom side 155 of insert 150 rather than top side 168 or within acoustic insulator portion 152. Other modifications can also be made.

What is claimed is:

1. An insert for use in a disc drive storage system including a disc rotatably mounted to a base having a bottom, an actuator mechanism mounted to the base and having a magnet assembly for positioning a transducing head over the disc, and a circuit board having electronic components mounted to the bottom of the base for controlling operations of the disc drive, the insert comprising:

an acoustic insulator portion compressible between, and adapted to suppress vibration of, the base and the circuit board; and a magnetic shield fastened to the insulator portion below the magnet assembly and shaped to shield a portion of the circuit board having an area that is substantially less than an area of the base from stray magnetic flux generated by the magnet assembly.

2. The insert of claim 1, wherein the acoustic insulator portion comprises a material selected from a group consisting of open celled polyurethane foam, polypropylene foam, and polyester foam.

3. The insert of claim 1, wherein the acoustic insulator portion has a thickness of approximately 25 mils.

4. The insert of claim 1, wherein the acoustic insulator portion includes an opening to accommodate a spindle motor.

5. The insert of claim 1, wherein the acoustic insulator portion includes a film layer having anti-static properties.

6. The insert of claim 5, wherein the film layer is made of polyurethane.

7. The insert of claim 1, wherein the magnetic shield is made of a material selected from the group consisting of 430, 1010, and 1008 steels.

8. The insert of claim 7, wherein the thickness of the magnetic shield is in the range of 2–10 mils.

9. The insert of claim 1, wherein the magnet assembly has a horizontal cross-sectional area and the magnetic shield is shaped to at least cover the horizontal cross-section of the magnet assembly.

10. The insert of claim 1, wherein:

the circuit board includes an electronic component; and the magnetic shield is shaped to shield the electronic component from the stray magnetic flux.

11. The insert of claim 1, wherein the magnetic shield is fastened to the acoustic insulator portion with an adhesive.

12. A disc drive storage system, comprising:

a base portion having a bottom;

a disc having a disc surface rotatably mounted to the base;

an actuator mechanism coupled to the base portion and adapted to position a transducing head over the disc surface, the actuator mechanism including a magnet assembly that produces stray magnetic flux;

a circuit board mounted to the bottom of the base portion and having an electronic component positioned below the magnet assembly; and an insert sandwiched between the base portion and the circuit board including an acoustic insulator portion compressible between, and adapted to suppress vibration of, the base portion and the circuit board, and a magnetic shield having an area that is substantially less than an area of the base fastened to the acoustic insulator portion below the magnet assembly and shaped to shield the electronic component from the stray magnetic flux.

13. A method of manufacturing a disc drive comprising steps of:

(a) providing a base portion having a bottom;

(b) rotatably mounting disc to the base portion, the disc having a disc surface;

(c) mounting an actuator mechanism to the base portion that is adapted to position a transducing head over the disc surface, the actuator mechanism including a magnet assembly that produces stray magnetic flux;

(d) providing a circuit board having an electronic component for controlling operations of the disc drive; and (e) sandwiching an insert between the base portion and the circuit board, the insert including an acoustic insulator portion adapted to suppress vibration of the base portion and the circuit board, and a magnetic shield having an area that is substantially less than an area of the bottom of the base portion fastened to the acoustic insulator portion below the magnet assembly and shaped to shield the electronic component from the stray magnetic flux.

14. A disc drive storage system comprising:

a circuit board including an electronic component; and vibration and acoustic dampening means for dampening vibration of the circuit board and shielding only a portion of the circuit board corresponding to the electronic component from stray magnetic flux.

* * * * *